US008842675B2

(12) United States Patent
Hutchison et al.

(10) Patent No.: US 8,842,675 B2
(45) Date of Patent: Sep. 23, 2014

(54) SYSTEMS AND METHODS FOR MULTICORE PROCESSING OF DATA WITH IN-SEQUENCE DELIVERY

(75) Inventors: Jerry Hutchison, Huntingdon Valley, PA (US); Christopher Stanziola, Staatsburg, NY (US)

(73) Assignee: L-3 Communications Corporation, New York, NY (US)

( * ) Notice: Subject to any disclaimer, the term of this patent is extended or adjusted under 35 U.S.C. 154(b) by 162 days.

(21) Appl. No.: 13/592,939

(22) Filed: Aug. 23, 2012

(65) Prior Publication Data

US 2014/0056307 A1 Feb. 27, 2014

(51) Int. Cl.
*H04L 12/54* (2013.01)

(52) U.S. Cl.
CPC ...................................... *H04L 12/56* (2013.01)
USPC ......................................................... 370/394

(58) Field of Classification Search
None
See application file for complete search history.

(56) References Cited

U.S. PATENT DOCUMENTS

| 5,864,540 | A | 1/1999 | Bonomi et al. | |
|---|---|---|---|---|
| 5,875,192 | A | 2/1999 | Cam et al. | |
| 6,721,309 | B1 | 4/2004 | Stone et al. | |
| 6,775,305 | B1 * | 8/2004 | Delvaux | 370/535 |
| 8,191,134 | B1 * | 5/2012 | Thangavelu | 726/14 |
| 8,646,090 | B1 * | 2/2014 | Gadde et al. | 726/26 |
| 2004/0001456 | A1 * | 1/2004 | Chao | 370/328 |
| 2008/0192661 | A1 * | 8/2008 | Hamamoto et al. | 370/310 |
| 2011/0185068 | A1 * | 7/2011 | Schmieder et al. | 709/227 |

OTHER PUBLICATIONS

Gounaris et al., "A novel approach to resource scheduling for parallel query processing on computational grids", Distrib Parallel Databases 19, © Springer Science + Business Media, LLC, May 25, 2006, 87-106.
Henzen et al., "FPGA Parallel-Pipelined AES-GCM Core for 100G Ethernet Applications", IEEE, Sep. 14-16, 2010, 202-205.
Machhout et al., "Efficient Large Numbers Karatsuba-Ofman Multiplier Designs for Embedded Systems", World Academy of Science, Engineering and Technology 52, 2009, 992-1001.
Satoh et al., "High-Performance Hardware Architectures for Galois Counter Mode", IEEE Transactions on Computers, vol. 58, No. 7, Jul. 2009, 917-930.
Zhou et al., "Improving Throughput of AES-GCM with Pipelined Karatsuba Multipliers on FPGAs", Proceedings of the 5th International Workshop on Reconfigurable Computing: Architectures, Tools and Applications, Springer-Verlag Berlin, Heidelberg, Jan. 2009, 193-203.

* cited by examiner

Primary Examiner — Hassan Kizou
Assistant Examiner — Tejis Daya
(74) Attorney, Agent, or Firm — Condo Roccia Koptiw LLP

(57) ABSTRACT

Methods and systems are described to allow for the parallel processing of packets and other subsets of data that are to be delivered in order after the completion of the parallel processing. The methods and systems may process packets and subsets of data that may vary in size by orders of magnitude. The packets may be transmitted and/or received over data transmission networks that may be orders of magnitude faster than the processing speeds of the parallel processors. Entire packets or subsets of data may be allocated to individual processing units without segmenting the packets between the processing units. A count value may be inserted as metadata to received packets in order to indicate a relative order of arrival. The metadata may be utilized by a multiplexor at the output of the parallel processing units in order to maintain in-sequence delivery of the processed packets.

12 Claims, 6 Drawing Sheets

SYSTEMS AND METHODS FOR MULTICORE PROCESSING OF DATA WITH IN-SEQUENCE DELIVERY

BACKGROUND

Computing systems that utilize parallel processing techniques have grown in number and value over the past decade. Additionally, parallel processing has been applied to a growing number of different computing applications. Parallel processing computing systems facilitate the concurrent execution of multiple processes during the same time period. When parallel processing is utilized, a single computational process may be divided into a number of sub-processes, and the computing system may execute the sub-processes contemporaneously, for example using different processing cores and/or different processors. The result from the sub-process computations may then be recombined, resulting in the same output as if the original process had been executed, although the execution of the sub-processes in parallel may take significantly less computing time depending on the number of sub-processes that are utilized. Multi-core processors, multiple processor computers, cluster computing, massively parallel processors (MPPs), and/or computing grids may be examples of parallel processing computing systems.

Additionally, the speed of communication networks has continued to increase exponentially. Gigabit Ethernet (e.g., 1 Gbit/s=1000 Mbit/s) has gradually become the norm and even faster speeds (e.g., Terabit Ethernet–1 Tbit/sec=1000 Gbit/s and faster) are expected to be introduced over the coming years. However, the processing speed of many hardware devices (e.g., the clock speed) has not increased as fast as the speed of the communication networks. Typically, communication packets and other forms of data may be delivered in sequence, making the task of performing parallel processing more difficult, especially when a communicated packet is to be transformed before, during, and/or after communication over a high speed network.

SUMMARY

Methods and systems are described to allow for the parallel processing of packets and other subsets of data that are to be delivered in order after the completion of the parallel processing. The methods and systems may process packets and subsets of data that may vary in size by orders of magnitude. The packets may be transmitted and/or received over data transmission networks that may be orders of magnitude faster than the processing speeds of the parallel processors. Entire packets or subsets of data may be allocated to individual processing units without segmenting the packets between the processing units. A count value may be inserted as metadata to received packets in order to indicate a relative order of arrival. The metadata may be utilized by a multiplexor at the output of the parallel processing units in order to maintain in-sequence delivery of the processed packets.

For example, a device for processing packets to be delivered in-order may include an input configured to receive a data stream, and the data stream may include a plurality of packets. A counter function may be configured to generate corresponding metadata for each packet of the plurality of packets received via the input. The corresponding metadata may include a count value that may be incremented each time one of the plurality of packets in the data stream is received. The device may include a plurality of processing units, and each of the plurality of processing units may be configured to process individual packets from the plurality of packets. Each of the individual packets from the plurality of packets may be allocated to one of the plurality of processing units without segmenting the individual packets. The device may include a multiplexor configured to multiplex packets processed by the plurality of processing units. An order for the multiplexing may be determined based on the corresponding metadata for each packet of the plurality of packets. The multiplexor may be configured to buffer at least a first packet from the data stream that is received at the input after a second packet is received at the input but that arrived at the output prior to the second packet arriving at the output. For example, the first packet may be buffered at least until after the second packet has been transmitted at the output.

The device may further include an output configured to transmit the packets processed by the plurality of processing units in the same relative order within the data stream as the plurality of packets were received within the packet stream at the input. The multiplexor may be further configured to remove the corresponding metadata for each packet of the plurality of the packets prior to packet transmission at the output. Each of the plurality of processing units may be configured to perform packet classification on a per processing unit basis. Each of the plurality of processing units may be configured to determine an integrity check value (ICV) on a per processing unit basis. The processing may include one or more of packet encryption, packet decryption, packet classification, or a checksum determination. The plurality of processing units may be a plurality of processing cores implemented in a field programmable gate array (FPGA) or an application specific integrated circuit (ASIC). One or more of the input or the output may be optical components, and the data stream may be sent and/or received over a high-speed optical transmission network.

Methods and systems for processing data blocks in parallel are disclosed. For example, an example method may include identifying a first data block. The first data block may be a subset of data within collection of data to be processed. For example, the collection of data may be a collection of data stored in shared memory that accessible by each of a plurality of processing units. The method may include determining metadata for the first data block. The metadata may indicate a relative order of the first data block with respect to other subsets of data within the collection of data. The method may include allocating the first data block to one of the plurality of processing units. The method may include processing the first data block at the one of the plurality of processing units. The method may include determining an appropriate output position for the processed first data block relative to other processed data blocks based on the metadata, and the other processed data blocks may be data blocks that are derived from the other subsets of data within the collection of data. The method may include storing the processed first data block in the shared memory at a location relative to the other processed data blocks that corresponds to a location of the first data block relative to the other subsets of data within the collection of data prior to processing. The metadata may be a count value and/or or a timestamp. For example, the timestamp may indicate an approximate time of arrival of the first packet at the input.

Example data processing appliances (DPAs) are disclosed. For example, a DPA may include an input configured to receive a plurality packets. The DPA may include a demultiplexor configured to append metadata to the plurality of packets. The metadata may indicate an order in which the plurality of packets were received. The DPA may include a plurality of processing cores. Each of the plurality of processing cores may be configured to process a portion of the plurality of packets independent of the other processing cores. The DPA may include a multiplexor configured to multiplex the plurality of packets after the plurality of packets are output from the plurality of processing cores based on the appended metadata. The multiplexor may be further configured to ensure the output of a given packet is delayed by at least a predetermined amount of time relative to an arrival time of the packet prior to sending the given packet to an output.

In an example, each of the plurality of processing cores may be configured to process the portion of the plurality of packets by encrypting the packets or decrypting the packets. In an example, the metadata may be a count value and the count value may be used as a packet sequence number (PSN) for one of a packet encryption process or packet decryption process for the plurality of packets. The multiplexor may be configured to ensure the output of the given packet is delayed by at least the predetermined amount of time using metadata for the given packet and the metadata for the given packet may be a timestamp value. The predetermined period of time may be selected to exceed a maximum processing delay for a largest possible packet of packets included in the plurality of packets. The plurality of packets may be output to a high-speed optical communication network.

In an example, methods for processing packets in parallel may include receiving a first packet of a packet flow at an input. The method may include determining metadata for the first packet. The metadata may indicate a relative order of arrival for the first packet within the packet flow. The method may include allocating the first packet to one of a plurality of processing units. The method may include processing the first packet at the one of the plurality of processing units. The method may include determining that the first packet is to be transmitted based on the metadata for the first packet. The method may include transmitting the first packet at an output in the same relative order within the packet flow as the first packet was received within the packet flow at the input.

DETAILED DESCRIPTION

Figure 1:
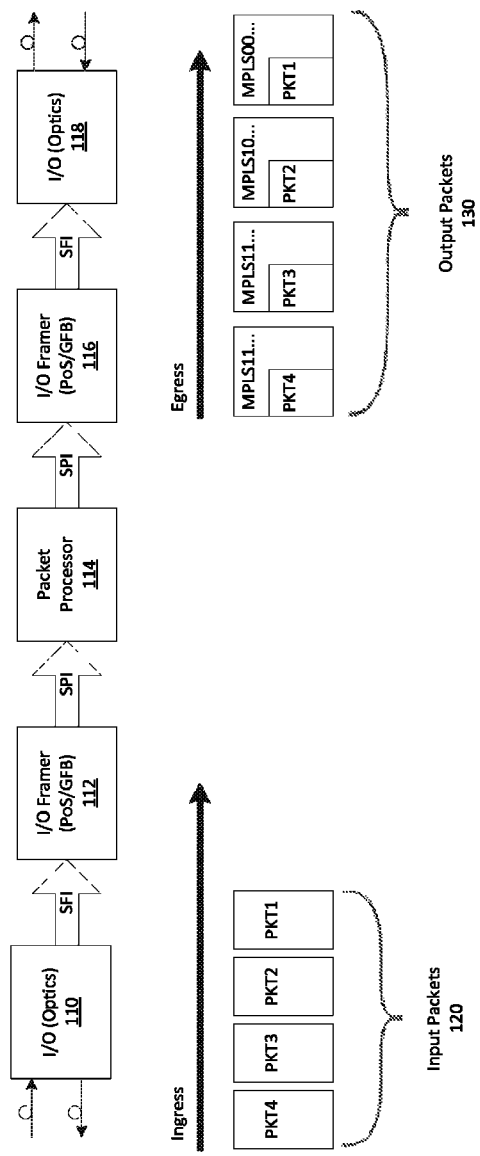
FIG. 1 illustrates an example DPA for application to data networks.

As data transmission rates continue to rapidly increase, processing bottlenecks may become more prevalent, for example when a data processing hardware device is unable to process a data flow at the speed at which the data flow is received over a high-speed network. Traditional single threaded processing engines and advancing electronic circuit technology may be associated with a given logic clock rate, and the processors of these devices may execute instructions at the given logic clock rate. As the transmission data rates increase, the logic clock rate of these devices may be less than (e.g., orders of magnitude less than) the transmission data rate of data sent over a high-speed network (e.g., a Terabit Ethernet network). In order to prevent a processing device from becoming a bottleneck in a high-speed network, the processing device may be modified in order to achieve increased data processing per logic clock cycle, thus increasing data processing throughput performance.

As disclosed herein, parallel processing techniques may be utilized in order to advance the performance of numerous hardware design approaches. Example processing approaches may include an engine with very wide logic data path and/or the use of pools of resources where entire packets may be allocated to individual engines. As disclosed herein, systems and methods may be used to process a data stream in parallel without affecting the data ordering within a data flow, without the utilization of a minimum data packet size that may be impractically large for many uses (e.g., such as Internet communications), and/or without the use of a centralized classifier or large amounts of dedicated data storage memory.

For example, multiple data packet processing cores may be utilized in a single Data Processing Appliance (DPA). A DPA may be configured to transform an input to a desired output. For example, the DPA may be configured to implement a mathematical transformation, to add additional data to input data, to remove certain data from input data, and/or to otherwise process or transform input data. Although examples disclosed herein may be describe the DPA in terms of networking applications (e.g., encrypting/decrypting packets, encapsulating/framing packets, processing packets, etc.), the techniques disclosed herein may be equally applicable to other functional processes. Additionally, although the examples disclosed herein may be described in terms of processing packets within a transmitted data flow, the methods and systems described herein may be equally applicable to processing any subsets of a data flow where the processing should be performed such that in-sequence delivery of the subsets of data with the flow is to be preserved.

A DPA-like architecture may be used for many reasons. For example, as logic design rules become smaller and smaller, logic speeds may not increase as significantly as one would expect for various reasons such as parasitics, process tolerances, and/or the like. Logic densities, however, may scale closer to expectations. Thus, as disclosed herein as the speed of I/O interfaces continue to increase (e.g., 400 Gb/s, 1 Tb/s, etc.) parallel logic synthesis realization of logic functions (e.g., encryption, processing, etc.) may be used to allow for high speed processing of the high speed I/O data. Parallel processing may be used since increases in the logic density of processing hardware may facilitate configurations that effectively process the increased data throughput associated with by the higher-speed I/O interfaces even though the intrinsic logic speed of smaller logic design rules (e.g., logic clock speed) may not have significantly increased.

In order to increase processing speeds, a DPA may be configured to process a data flow using parallel processing techniques. Additionally, the DPA may be configured to provide in-sequence delivery of individual units within the data flow after processing. For example, if the data flow is a flow of packets, the DPA may be configured to process/transform the packets in parallel and to provide in-sequence delivery of the processed packets (e.g., the output packets may be in the same order as they were received at the input). The DPA may provide high speed I/O and/or multiplexing of data to/from a multiplicity of cores/processors. The DPA may process packets in a data network, backplane, and/or in a computer bus environment. For purposes of description and illustration, examples may be discussed in terms of network protocol environments such as Internet Protocol (IP) or Ethernet, although the applicability of the systems and methods disclosed herein to other network protocol environments is contemplated.

Despite the use of many parallel cores, the functional behavior of the DPA from the perspective of an external device may be unchanged. In other words, the parallel processing techniques utilized to process a data flows may be transparent to other devices in communication with the DPA. For example, the processing may be performed in a way so as to provide compatibility with DPAs operating a single core or many cores. Thus the processing techniques disclosed herein may allow for the interoperability between processing devices utilizing multiple cores that are in communication with other processing devices utilizing a different number of cores and/or a single core. When referred to herein, the term processing core may refer a single central processing unit (CPU) of a computing component, where the computing component is comprised of multiple CPUs that are utilized to execute program instructions. Although examples may be described with respect to processing cores, the methods and systems disclosed herein may be equally applicable to other parallel processing computing environments, for example the concurrent use of multiple, independent processors.

Systems and methods disclosed herein may allocate an entire packet(s) to an individual core using a multiplexing technique. The multiplexing technique may be implemented so as to prevent packet re-ordering at the output of the DPA. For example, reordering of packets may be prevented within a single flow and/or across multiple flows. Such results may be achieved without the requirement that an entire flow be allocated to a single core, thus allowing a single large flow to be processed across multiple cores without re-ordering. The restoration of packet order may be achieved without the use of high speed, common output packet memory, therefore providing highly scalable implementations.

In many common networking communication systems the preservation of packet order may be a key to avoiding major network performance problems. For example, certain applications or communication layers may expect data delivery to be provided without re-ordering, and the processing performed by these applications or communication layers may result in substantial errors if the original data ordering is not preserved. Additionally, many transformations that are performed on an individual packet of a flow or a subset of a flow may be performed based on the entire contents of the individual packet or subset. Thus, if the packets or subset of the flow is segmented or otherwise divided for processing by multiple cores or processors, performing the transformations may be very complex, as the cores may be forced to process the packet or subset in a coordinated fashion.

For example, a checksum calculation is often appended to packets during processing (e.g., a frame check sequence (FCS) for Ethernet frames, an IP data checksum for IP packets, a User Datagram Protocol (UDP) checksum for UDP packets, a Transmission Control Protocol (TCP) checksum for TCP packets, etc.). A checksum may be a fixed-size datum computed from an arbitrary block of digital data (e.g., the data within the packet being processed) for the purpose of detecting accidental errors that may have been introduced during transmission, processing, and/or storage. For example, the integrity of the data within a packet may be checked at a later time by re-computing the checksum and comparing the result with the checksum value appended to the packet. If the checksum calculations match, it may be an indication that the data within the packet has not been altered. The procedure that yields the checksum from the data within the packet is often referred to as a checksum function or checksum algorithm.

Often checksum functions may be implemented using hash functions, fingerprints, randomization functions, Galois checksums, cryptographic functions (e.g., cryptographic hash functions) and/or the like. Check digits and parity bits may be examples of checksums that are often used for small blocks of data (e.g., Social Security numbers, bank account numbers, computer words, single bytes, etc.). Some error-correcting codes are based on special checksums that may be utilized to both detect common errors and also allow the original data to be recovered in certain cases. However, most or all of the data within a processed packet may be used as a input to determine a checksum. Hence, if a packet is segmented for processing across multiple processors or processing cores, additional complexity may be introduced in order to calculate a checksum where some of the data in the packet is processed by a first core and some of the data is processed by a second core.

Therefore, in the systems and methods described herein, entire packets may be multiplexed to individual cores in order to allow the distribution of complex functions such as packet classification and checksum calculation individually in each of a plurality of parallel cores. By doing so, the methods and systems disclosed herein may avoid the very low efficiency performance for small packet sizes associated with previous parallel processing approaches. The result may be the capability to scale the performance of a given technology by a large factor (e.g., 16× or more) over that of traditional methods without negative consequences of other parallel schemes. The amount of scaling may be directly related to the number of cores utilized. The methods and systems disclosed herein may take advantage of the increased circuit density provided by electronic circuit technology advancements to increase throughput without increased logic clock rates.

FIG. 1 illustrates an example DPA for application to data networks. The DPA may include input/output (I/O) elements, for example I/O 110 and I/O 118. In an example, I/O 110 and I/O 118 may be optical components. For example, optical I/O components may be utilized for communicating digital information using lasers, light emitting diodes (LEDs), or other light sources over optical fibers at high line rates. Example I/O protocols may include "Packet over Synchronous Optical Network (SONET)" (POS), Generic Framing Procedure (GFP), Synchronous Digital Hierarchy (SDH), and/or the like. In an example, I/O 110 and I/O 118 may include a Serializer/Deserializer (SerDes) and may be configured to convert data to a form suitable for transmission/reception over an optical network. As may be appreciated, the I/O functions may be configured based on the capabilities and purpose of a particular network, and the I/O functions may be different for different networks.

I/O 110 may interface with an I/O framing components, for example via a SerDes Framer Interface (SFI). The SFI may provide an interface between an I/O framing component (e.g., I/O Framer 112, I/O Framer 118) and an optical network. Example functions that may be performed by I/O Framer 112 and/or I/O Framer 116 may include physical layer encoding/decoding, framing/de-framing, forward error correction (FEC), other Layer 1/Physical Layer processing, and/or the like. Additionally, the DPA may include Packet Processor (PP) 114. PP 114 may be a parallel processor such as a multicore processor. PP 114 may be configured to adapt/transform data between differing network protocols and/or otherwise change or modify a data stream. I/O Framer 112 and/or I/O Framer 116 may interface to PP 114 via a System Packet Interface (SPI). The SPI may be a channelized packet interface, for example as commonly used in synchronous optical networking and/or Ethernet applications. In an example, the SPI may provide an interface between a Media Access Control (MAC) layer (e.g., MAC layer for IP network) and a network processor (e.g., PP 114). In an example, the SPI may provide an interface between a packet processor Application Specific Integrated Circuit (ASIC) and a traffic manager device.

The DPA may be configured to separate two network domains that may be running different protocols and/or have other distinctive characteristics. Examples of adaptation functions that may be implemented in the DPA include Network Protocol Translation, Network Address Translation (NAT), encryption, packet data inspection, firewalls, and/or the like. For example, PP 114 may be configured to translate Internet Protocol (IP) format data from an input (e.g., Input Packets 120) into Multi-Protocol Label Switching (MPLS) format at the output (e.g., Output Packets 130) and vice versa. The translation may involve one or more functions such as performing an IP address lookup, determining shim (e.g., a four byte shim) with new addressing and/or protocol information, adding a shim to the IP data packet to produce a new packet format, and/or other types of transformations. A similar process may be implemented by PP 114 in order to remove the shim for data passing and/or otherwise perform a reverse translation when the packets reach their destination. In general, I/O 110 and I/O Framer 112 may operate according to a first network protocol or format, I/O 118 and I/O Framer 116 may operate according to a second network protocol or format, and PP 114 may process packets, translate between the first and second network protocols or formats, and/or the like.

Recently, the highest I/O throughput capability of the network protocol circuitry has exceeded the packet processing throughput capability. For example, in many high performance field programmable gate arrays (FPGAs) currently available, a well-designed single core packet classifier may support roughly 25 Gb/s of small packet throughput. However, the same FPGA may support 100 Gb/s or more of I/O bandwidth. Network data rates are rapidly increasing and have exceeded the performance of hardware techniques for data processing. Advancing electronic circuit technology has not yet significantly increased logic clock rates, thus limiting the potential throughput for processing tasks. In order to achieve the desired processing speeds assuming that the clock rate is not increased to a level that would support the desired processing throughput, more data may be processed per logic clock cycle to achieve the higher processing rates. For example, in order to increase processing throughput to achieve processing rates on par with potential I/O data rates, higher performance multiple core and/or parallel processing may be utilized.

There are many processing approaches for increasing processing throughput. For example, processing components may be configured to include an engine with very wide logic data bus, use pools of resources where entire packets are allocated to individual processing engines, use processing pools of resources where the packet words are multiplexed to multiple independent processing engines, and/or the like. However, different processing approaches may also introduce additional complexity into the system. The without additional refinement, the traditional processing/parallel processing approaches may result in low efficiency at small packet sizes (e.g., resulting in sub-rate throughput), minimum packet sizes that are impractical relative to network norms, and/or affecting the packet ordering within a flow.

For example, one method of increasing the processing performance may be to increase the width of the processing data path. In the quest for speed, a typical data path width has progressed from 8 bits to 64 bits or more in general applications. In custom hardware designs, data path width of 128 bits has been common and recently has increased to 512 bits. To further increase performance a data path width of 1024 bits or more may be considered. However, there may be an issue related to small packet performance using such an approach. For various reasons related to processing complexity and efficiency, bit 0 of a packet is typically processed at bit 0 of a data word of the processor. That is to say, the packet may be processed in a manner such that it is "word aligned." As a consequence, efficiency may be low for small packets if the data path is very large in size. For example, a Voice over IP (VoIP) packet may be as small as 20 bytes (160 bits). If stored in a 512 bit word, approximately 30% of the bits would be used to carry information while approximately 70% of the bits would be padding. Such a scenario translates to approximately a 30% throughput relative to the theoretical throughput of the device given the data path width and the logic clock rate. For a larger 1024 bit word, the efficiency/throughput would be roughly 15%. This issue may actually be exacerbated by the common practice of removing network headers from the packet data before packet processing of the data field.

Encryption/decryption is an example processing technique that may benefit from the use of parallel processing rather than increasing the size of the data path. For example, one encryption/decryption technique known as Galois/Counter Mode (GCM) may utilize an Electronic Code Book (ECB) that may provide 128 bits of key stream or encrypted data for each logic clock cycle. Due to constraints based on the calculation of an integrity check value (ICV) for GCM, it may be inefficient to implement data paths wider than 128 bits. In order to ensure that a GCM encryptor utilizing parallel encryption cores is interoperable with a variety of GCM decryptors that may or may not be using a plurality if decryption cores (and/or a different number of cores), standard GCM encryption/decryption should be used. By doing so, a high rate encryptor/decryptor (e.g., using multiple cores) may effectively communicate with a low rate encryptor/decryptor (e.g., using a single core).

When performing decryption, an ICV may be generated using a series of multiplication steps on a series of 128 bit CT words. Each result in the series may incorporate the previous result multiplied by the current 128 bit CT word. Galois math is such that the process is not associative and thereby, the process may be difficult to extend to words wider than 128 bits. In an effort to increase the speed of encryption/decryption, the data path may be widened to 512 bits, which may correspond to a theoretical improvement in processing speed by a factor of four. Such a techniques may use a minimum of six data bus cycles to complete the Galois hash calculation after the packet data is processed. However, a 64 byte packet may be encrypted in a single clock cycle. For 64 and 512 byte packet sizes the Galois hash overhead may translate to an engine efficiency of 14% and 53%, respectively. For these cases, the use of a widened data path may have very little practical performance improvement over a single processing core that is 128 bits wide. Hence, other approaches may be used to achieve the desired performance increase.

In an example, complex packet processing may be pipelined. For example, pipelining may refer to a set of data processing elements connected in series, so that the output of one element is the input of the next. The elements of a pipeline may be executed in parallel. Pipelining may result in some amount of buffer storage being inserted between elements. The processing steps may be performed in parallel by dedicated logic organized as sequential processing steps. Parallelization of operations may increase throughput. For example, a first logical element may process a first word of data while a second logical element is processing a second word. As is described herein, some logical operations such as the calculation of an integrity checksum may become highly inefficient when widened and/or pipelined. While wide and/or pipelined data path designs may improve throughput for large packets, the techniques may fail to improve small packet throughput.

Another way of increasing performance may be to make the data path wider with an approach referred to as Parallel Pipelines. In this example, each pipeline may operate on words within the same packet until the packet is serviced. Two or more processors may be operated in parallel, with each processor processing a pipeline. For an example in terms of encryption, prior to the start of packet processing, a centralized classifier resource may identify the cryptographic initialization vector and load the cryptographic processing cores. The payload of a packet may be distributed to two or more cores for parallel processing. Included in this processing may be the running calculation of subcomponents of the Galois ICV. At the end of processing, a centralized GCM engine may combine the ICV components into the final packet ICV. For a four core configuration, the two centralized steps may contribute a minimum of two extra data bus cycles, providing an efficiency of 33% and 80% for 64 and 512 byte packets, respectively. While this inefficiency is a significant issue, of more concern may be the use of a high-speed classification to identify the ICV on a packet-by-packet basis. Classification at 4-16× the maximum core processor rate may be extremely difficult to realize in practice for IPv4/IPv6 protocol except for trivial implementation cases (e.g., such as for 16 or fewer address pairs). If the number of addresses is small, the address may be stored and matched in register logic allowing high speed classification. However, practical implementations of encryption/decryption units typically provide roughly 1,000 to 10,000 addresses to be classified such that the register-based classifier may be insufficient. For example, the register-based classifier may use a complex device like a Content Addressable Memory (CAM), but CAMs may fail to run at the desired rates, thereby limiting the applicability of parallel pipelines.

Other types of packet classification are often performed during packet processing. In an example, any type of packet categorization or packet identification may be considered packet classification. For example, packet classification may include identifying the flow that an individual packet is associated with and/or identifying what services an individual packet should receive. Example services that may be performed based on the result of packet classification may include packet filtering, policy enforcement, routing, accounting/billing, traffic rate limiting, traffic shaping, and/or the like. The classification may be performed based on fields within a packet header and/or a header of an encapsulated packet if techniques such as deep packet inspection (DPI) are utilized. The fields used for packet classification may include one or more of source address(es) (e.g., IP address/network-layer address, Ethernet address/link-layer address, a source port/transport layer address, etc.), destination address(es) (e.g., IP address/network-layer address, Ethernet address/link-layer address, a source port/transport layer address, etc.), a security association, a protocol field, a protocol flag, transport layer field(s), network layer field(s), link layer field(s), QoS fields, and/or the like.

Figure 2:
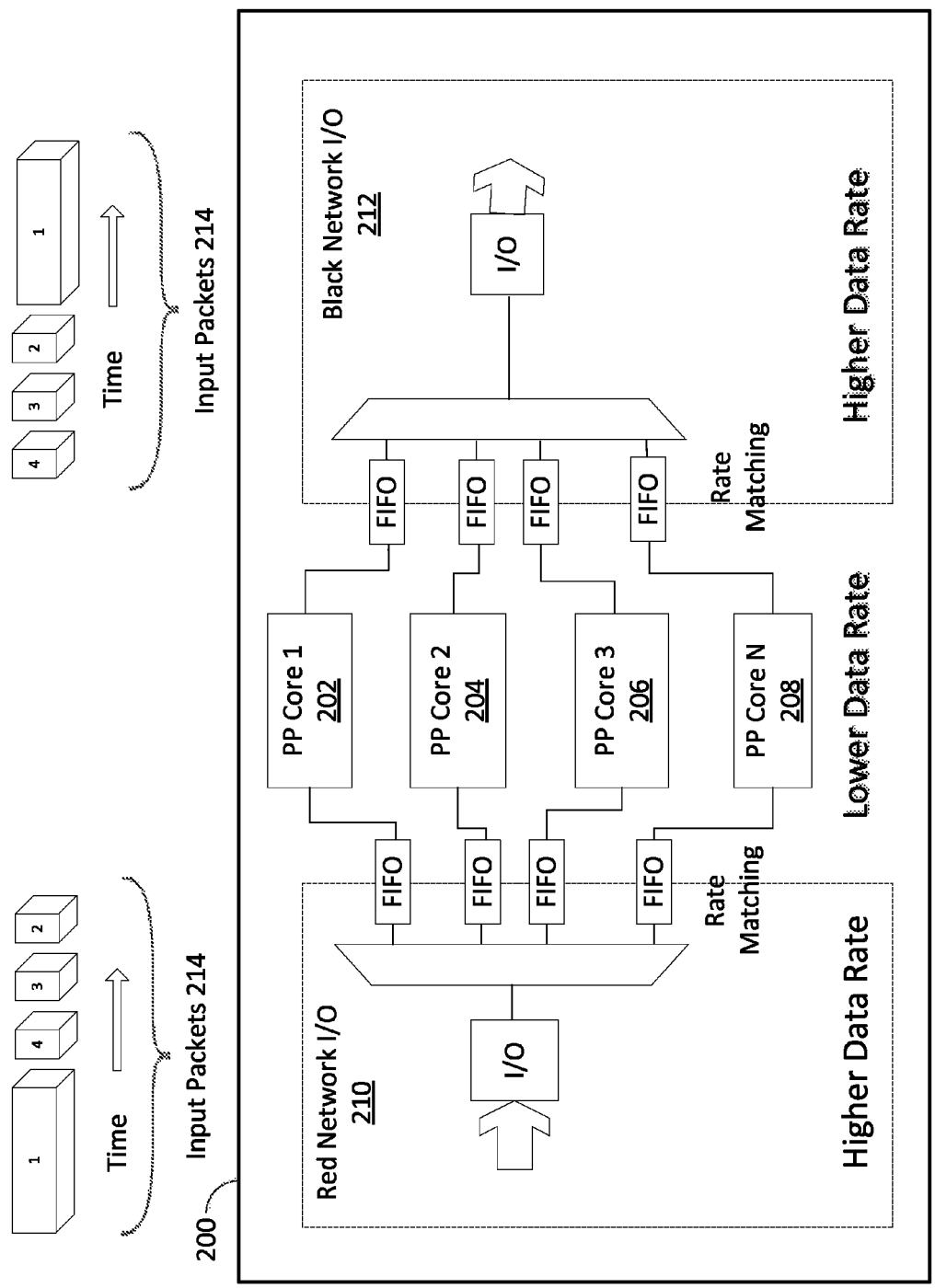
FIG. 2 is an example DPA that utilizes multiple processing cores.

A DPA containing two or more processors may provide a basis for increasing the traffic throughput of the DPA to match the network. An example of a DPA that utilizes multiple processing cores is illustrated in FIG. 2. Although a single direction of data packets are illustrated for DPA 200 of FIG. 2 (e.g., Input Packets 214 from Red Network I/O 210 are transformed to Output Packets 216 to be sent via Black Network I/O 212), DPA 200 may be a duplex device that is configured for bi-directional communication.

When used herein the terms "Red Side" or "Red Device" may refer to devices or interfaces within a trusted network or a secure network. User data within a red/trusted/secure network may be unencrypted. Unencrypted data within a red/trusted/secure network may be referred to as plaintext (PT) data. When used herein the terms "Black Side" or "Black Device" may refer to devices or interfaces within an untrusted network or a non-secure network. An example of a non-secure network may be the Internet. User data within a black/untrusted/non-secure network may be encrypted. Encrypted data within a black/untrusted/non-secure network may be referred to as ciphertext (CT) data.

For example, as illustrated in FIG. 2, incoming packets such as Input Packets 214 may be received at Red Network I/O 210. For example, Input Packets 214 may be received from a high speed network protocol (e.g., I/O function). Input Packets 214 may be demultiplexed into a pool of packet processing resources. For example, DPA 200 may include two or more parallel processing (PP) cores (e.g., PP Core 1 202, PP Core 2 204, PP Core 3 206, PP Core N 208). Input Packets 214 may be demultiplexed in a number of different ways. Each packet may be assigned and routed to an individual core. Thus, each packet may be entirely processed by an individual core rather than segmenting the packet and distributing the processing of the segments across multiple parallel cores. For example, a round robin protocol may be used for demultiplexing, but other demultiplexing techniques may also be utilized. Rate matching may be performed when transitioning between the higher speed communication network(s) and the lower speed processing domain. First-In-First-Out (FIFO)/multiplexing elements may be configured to perform the rate matching. For example a series of FIFO elements/buffers may be used as an interface between the Red Network I/O 210 and the packet processing elements (e.g., PP Core 1 202, PP Core 2 204, PP Core 3 206, PP Core N 208). Second FIFO/multiplexing elements may be implemented at the output of the processing pool to Black Network I/O 212. The result may be for Output Packets 216 to be sent onto a network via Black Network I/O 212.

In order to utilize such an approach, techniques may be specified for maintaining a desired packet order. For example, the difficulty in maintaining the proper packet order may be demonstrated with an example of variable size packets, although the difficulty of maintaining the proper order may be applicable to packets of varying size and/or homogeneity. For example, with variable packet sizes, the processing time within the a PP Core may vary based on the size of the packet.

The effect of the variance in processing time for different sized packets is illustrated at the top of FIG. 2. For example, assume that four packets are to be processed (e.g., Packet 1, Packet 2, Packet 3, and Packet 4). Additionally, assume that Packet 1 is larger than the other packets, and that the other packets are approximately equally sized. The longer Packet 1 may be passed by the shorter Packets 2, 3, and/or 4 as the flow processed through the pool of parallel PP cores. The result may be that the order of the packets is changed during the processing of the packets.

Another example of the difficulty in maintaining packet order during parallel processing may be when the clock rate is different between a higher speed packet transmission network (e.g., a higher data rate domain) and the parallel processing elements (e.g., the lower data rate domain). For example, upon egress from the high speed transmission network to the lower speed processing domain, multiple packets may be demultiplexed into the lower data rate domain on each clock tick for the lower date rate domain clock. Hence, if the difference in arrival time is less than the clock speed of the lower speed domain, the difference in arrival times may be lost due to digitization of time and/or quantization error. Additionally, FIFO behavior and/or clock synchronization may add practical complications to the more easily seen causes of packet reordering. Creation of out-of-order packets within a flow may cause major network performance problems. For example, in packet-based cryptographic systems, specialized logic may be used to prevent certain attacks against the communication system, such as a replay attack. Replay attack detection and/or responses may be significantly compromised if out-of-order packet sequences are allowed and/or created by the encryption process. Hence, maintaining packet temporal order may be highly desirable to help detect and/or respond to such attacks. Additionally, in many applications the packets that arrive out-of-order are stored in memory until the missing packets arrive. For bulk data transfers and transmissions utilizing multiple flows, the storage of out-of-order packets may result in the use of large buffers, which are often expensive to implement in many practical high-speed networks.

One example technique to address the packet reordering problem may be to restrict a flow to a single processing core. Thereby, packet reordering may occur across flows but not within a flow. This may be an acceptable solution in cases where the flow is small relative to the capability of a single engine. However, for many practical applications, such as bulk data transfers, the speed at which data from a single flow arrives at a processing core may exceed the processing speed of the core. For example, in many bulk data transfers there may be a single flow that is transmitted at speeds that exceed the processing capability of the core. Hence, it is not feasible to restrict the flow to a single core an achieved the desired processing speeds.

Moreover, even with smaller flows, assigning individual flows to individual processing cores may entail that the classification function for the flows to be included in the higher data rate domain. Such an approach may be infeasible for certain application and/or may limit the overall throughput. For example, if the highest speed logic available were applied to the individual processing cores in order to maximize throughput, a higher speed lookup function may not be able to be performed in the shared I/O logic. Further, there may be many cases where order should be preserved across multiple flows. One technique for performing the re-ordering across multiple flows may be to reorder the packets in a memory located in the high-speed output I/O function. However, such an approach may also limit the scalability of the device due to added cost and complexity.

Figure 3:
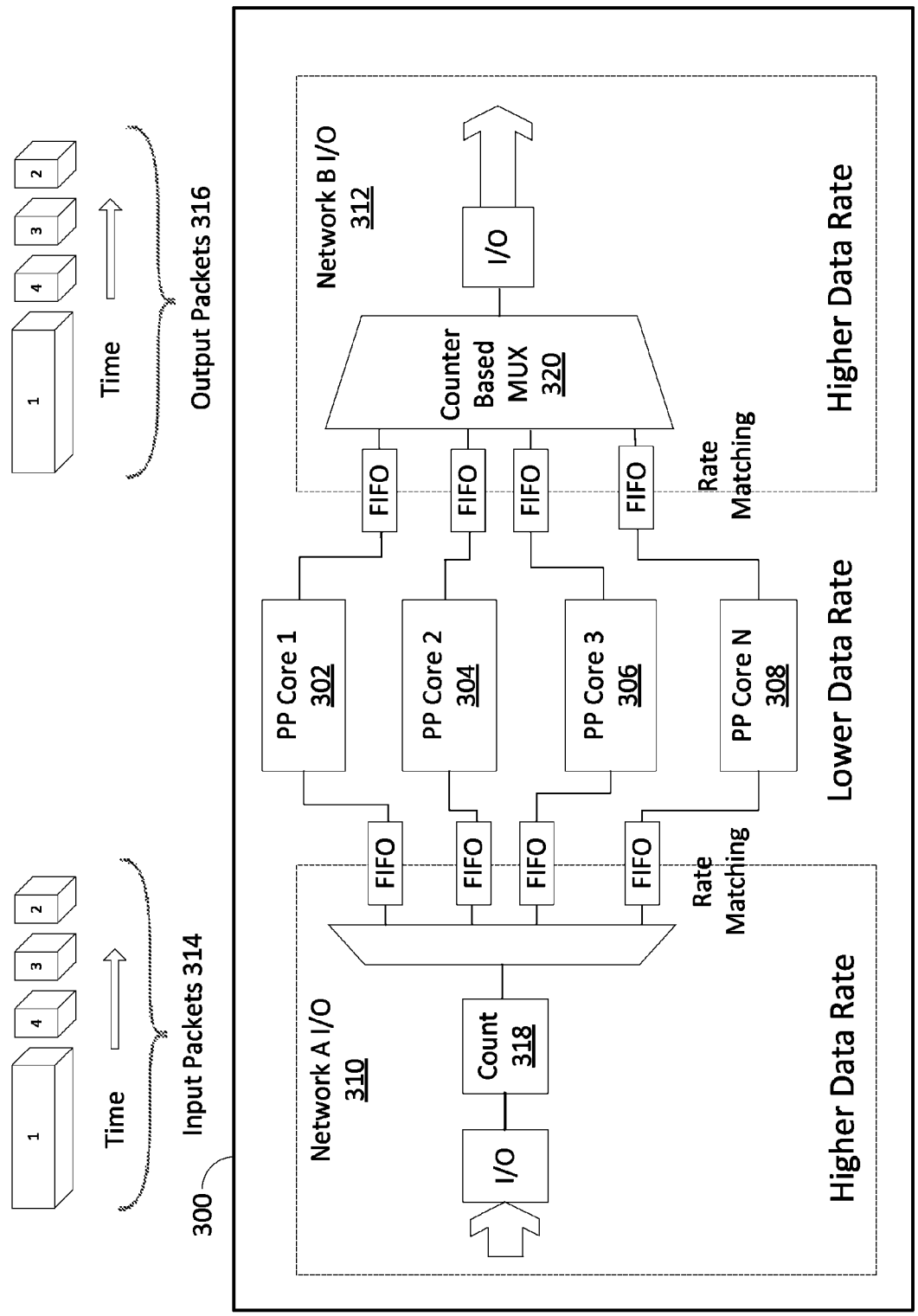
FIG. 3 illustrates an example DPA with multiple processing cores and a mechanism for ensuring in-sequence delivery of processed packets.

FIG. 3 illustrates an example DPA with multiple processing cores and a mechanism for ensuring in-sequence delivery of processed packets. DPA 300 may be configured to process variable size packets without creating out-of-order packets within a flow. For example, as illustrated in FIG. 3, incoming packets such as Input Packets 314 may be received at Network A I/O 310. The Input Packets may vary in size, and large packets may be orders of magnitude larger than small packets. For example, a small packet may correspond to a packet on the order of a few bytes to a few hundred bytes (e.g., 1-200 bytes; ~20-40 bytes may be a typical range for IP packets for example), while a large packet may correspond to a packet on the order of thousands of bytes (e.g., 1,000-100,000 bytes; ~1,500-9,000 bytes may be a typical range for IP packets for example). Input Packets 314 may be received from a high speed network protocol (e.g., I/O function). Prior to Input Packets 314 being demultiplexed into a pool of packet processing resources, a centralized counter (e.g., Count 318) may insert metadata into Input Packets 314. The metadata may be indicative of the relative order of arrival of Input Packets 314. For example, the inserted metadata may be the output of a linear synchronous counter located at Count 318. The counter may be configured to increment one time for each received packet. The counter may be configured to count/ increment faster than the maximum arrival rate of minimum sized packets. The result of the counter processing may be that each of Input Packets 314 is assigned a count value, which is stored with the packet as metadata.

Once the metadata (e.g., the count) has been added to each of Input Packets 314, Input Packets 314 may be demultiplexed for processing by the PP core pool. For example, DPA 300 may include two or more PP cores (e.g., PP Core 1 302, PP Core 2 304, PP Core 3 306, PP Core N 308). Input Packets 314 may be demultiplexed in a number of different ways. For example, a round robin protocol may be used but other multiplexing techniques may be utilized. For round robin scheduling the demultiplexor may include a separate queue for each data flow, where a data flow may be identified by its source and destination address, although other techniques for identifying a data flow may be used. Using round robin scheduling may allow active data flows that have data packets in the queue to take turns in transferring packets on a shared channel in a periodically repeated order. The scheduling may be work-conserving, meaning that if one flow is out of packets, packets from the next data flow may be server to the processors. Hence, the scheduling may attempt to prevent resources from going unused. Other example techniques for demultiplexing may include a weighted round robin, a deficit round robin, and/or the like.

Rate matching may be performed when transitioning between the higher speed communication network(s) and the lower speed processing domain. FIFO/multiplexing elements may be configured to perform the rate matching. For example a series of FIFO elements/buffers may be used as an interface between the Network A I/O 310 and the packet processing elements (e.g., PP Core 1 302, PP Core 2 304, PP Core 3 306, PP Core N 308). By inserting the metadata prior to demultiplexing, the packet classification, checksum calculation, and/ or other processing or transformation that is performed on a per packet basis may be distributed to the individual cores. For example, each packet from of Input Packets 314 may be forwarded to one of the individual PP Cores.

Since each of the PP Cores may perform processing on entire individual packets, each PP Core (e.g., PP Core 1 302, PP Core 2 304, PP Core 3 306, PP Core N 308) may have access to a copy of the classification database for the packets. The classification database may operate at a rate of 1/N relative to the Higher Data Rate domain, where N may be the number of PP Cores. By allowing each of the respective PP Cores to independently classify and/or process individual packets, performance and implementation issues such as centralized classification and lower data bus efficiency due to word multiplexing may be mitigated. The count value that is inserted as metadata may be left unmodified by the PP Cores during processing. For example, by processing the packets without modifying the count value, the count value created at the input may be available on the output side to provide a guide for packet order preservation.

Upon the completion of processing by the PP Cores, FIFO elements may be utilized for rate matching in conjunction with Counter Based Multiplexor 320. For example, Counter Based Multiplexor 320 may receive the processed packets from the individual PP Cores in the Lower Data Rate domain. As illustrated in FIG. 3, when a large packet (e.g., Packet 1) is delayed in arriving at the output relative to small packets (e.g., Packet 2, Packet 3, Packet 4), for example due to increased processing time and/or complexity, Counter Based Multiplexor 320 may determine to refrain for servicing the small packets arriving out-of-order until the large/delayed packet has completed processing. Counter Based Multiplexor 320 may use the count value metadata that was inserted by Count 318 at the input in order to determine the relative order the packets are to be transmitted via Network B I/O 312. The processed packets may be temporarily stored in rate matching FIFOs, for example to ensure that the smaller packets that were processes more quickly match the delay of a larger packet that took more time to process. The result may be for Output Packets 316 to be sent onto a network via Network B I/O 312 in the same order that they were received at Network A I/O 310.

In order to ensure that the packets processed by the multiple PP Cores are delivered to the output network in the same order that they were received by the input network, a counter may be implemented at the input to the PP Cores and a counter based multiplexor may be implemented at the output of the PP Cores. The counter at the input may be configured to insert a count value to each received packet. The count value may be the output of a linear synchronous counter. The counter may be configured to increment one time for each received packet. The counter may be configured to count faster than the arrival rate of minimum sized packets. The counter and the counter based multiplexor (which also may be referred to as a Multiplexor Server or MServer) may be initialized or reinitialized in coordinated fashion. For example, in order for the MServer to transmit packets in order based on the count value of the processed packets, the MServer may be initialized to the same value as the counter. The MServer may be configured to maintain an indication of the last count value served for a packet, and may determine that the next packet to serve is the packet that includes the next count value in the sequence. A MServer, which may interface between the FIFOs operably coupled to the output of the PP Cores and the output I/O function, may serve the FIFO queues in order of the count value included as packet metadata by the input counter function. In an example, transient errors and/or upsets may be accounted for by configuring the MServer to serve the current minimum value seen in the metadata of queued packets, for example after the MServer has waited some predetermined or variable period for an expected count value that cannot be found. In an example, a transient error may be detected by occurrence of a timeout triggered by a packet reaching the maximum allowable delay through the DPA while one or more output queues still have packets to be transmitted.

The use of the Counter and MServer together may preserve order of the packet stream processed by the DPA. A packet that arrived at the output relatively early that would otherwise be served out-of-order may be buffered until it is served in the correct order relative to other packets. The FIFO depth needed to allow such processing is relatively small, on the order of one large packet size. The MServer may be configured to delete the metadata including the count value prior to sending the packet out of the DPA.

The systems and methods disclosed herein may be applicable to any data processing appliance that is composed of parallel cores performing any function including time variable functions. Moreover, processing each of the packets may be performed in an individual core without segmentation and/or concatenation. Complications and/or deficiencies associated with the packet classification or utilization of Content Addressable Memory (CAM) may be mitigated, as these functions may be distributed to the individual PP Cores. For example, instead of utilizing a centralized, complex classification function, the disclosed systems and methods may utilize distributed classification functions and a counter capable of operation a high data rates.

Table 1 illustrates example processing efficiencies or various packet processing approaches that may be utilized to process packets while maintaining in-sequence delivery at the output of the operation. The first column lists an example of various packets sizes that may be transmitted over a data network. The example packet sizes may be typical packet sizes associated with IPv4 packets. For example, a 188 bit packet may correspond to an approximate size of a moving picture experts group (MPEG) packet for video data. The second column lists approximate theoretical packet processing efficiencies for an example parallel processing system utilizing four 128-bit cores with the count-based multiplexing method described herein. The third column lists approximate theoretical packet processing efficiencies for an example parallel processing system which utilizes two 256-bit cores without the count based multiplexing. Finally, the fourth column lists approximate theoretical packet processing efficiencies for an example parallel processing system utilizing as single 512-bit core. The calculated efficiencies may assume that Galois integrity generation and checking is performed by the parallel cores. For purposes of comparison, assuming an equal distribution of the four packet sizes listed in Table 1, the average throughput of the four 128-bit cores using the count based multiplexing methods may be approximately 90 Gb/s. Similarly, the average throughput of the two 256-bit cores without the use of count based multiplexing may be approximately 72 Gb/s. Finally, the average throughput of the single 512-bit core may be approximately 48 Gb/s. Hence, in practical scenarios where the data to be processed may be variable in size and/or relatively small in size, the count-based multiplexing method may yield significant increases in processing throughput while maintaining in-sequence delivery of processed packets.

TABLE 1

Example Efficiencies of Various Processing Approaches

| Packet Size | Four 128-bit Cores using a Count and MServer | Two 256-bit Cores without Count/MServer | One 512-bit Core |
|---|---|---|---|
| 64 bits | ~80% | ~40% | ~14% |
| 188 bits | ~90% | ~65% | ~29% |
| 640 bits | ~91% | ~87% | ~66% |
| 1472 bits | ~99% | ~93% | ~82% |

In an example, the DPA inserting a count value to ensure in-order packet delivery may be configured to reduce and/or nearly eliminate packet jitter injection by the DPA. Often, an important aspect of Quality of Service (QOS) may be packet jitter, for example if a data flow has been paced by an originating source to best serve the network requirements and/or applications. For example, a DPA, whether composed of a single processor or multiple PP cores, often disturbs the original packet timing. The disturbance in timing is illustrated in FIG. 2. If a small packet (e.g., Packet 2, Packet 3, Packet 4) is sent to a DPA that is otherwise idle, these small packets may traverse the DPA in a minimum time. However, if the small packets are sent immediately after a large packet (e.g., Packet 1), the small packet may experience delays that are much higher than the minimum delay. For example, the delay for a packet to traverse the DPA may be impacted by the packet size of other traffic, injecting jitter on the packet stream.

Figure 4:
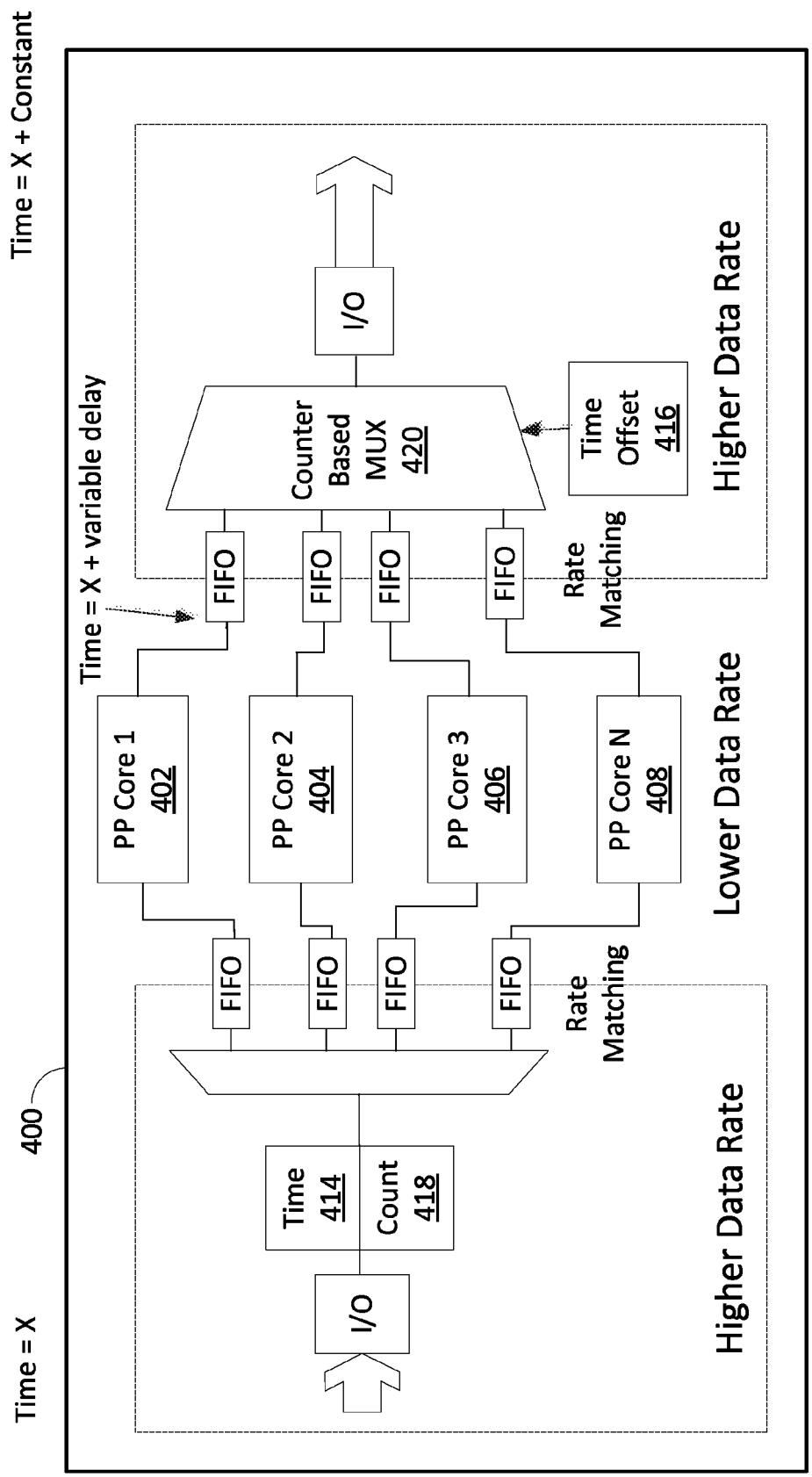
FIG. 4 illustrates an example architecture for minimizing or eliminating jitter.

FIG. 4 illustrates an example architecture for minimizing or eliminating jitter, for example jitter due to DPA processing. The jitter may be reduced and/or effectively eliminated by adding a time based function as shown in FIG. 4. In addition to the corresponding components that were also described with respect to FIG. 3 (e.g., PP Core 1 402, PP Core 2, 404, PP Core 4 406, PP Core N 408, Count 418, Counter Based Multiplexor 420), DPA 400 may also include Time 414, which may be a logical element that adds an approximate time of arrival to the metadata of a received packet. For example, when a packet is received by DPA 400, metadata may be added that includes one or more of a count value for the packet and/or an arrival time for the packet. The arrival time may be used to ensure that a certain time offset is enforced from the time of arrival until the time of packet egress at the output of DPA 400. By ensuring that each packet is delayed by a specified amount of time prior to transmission at the output, DPA 400 can ensure that the relative time distance between received packets is maintained for the processed packets at the output.

In an example, when a packet is processed by a PP Core, the time taken to perform the processing may introduce a variable delay in the transmission of the packet. The length of the variable delay may depend on a variety of factors, for example the size of the packet, the capabilities and configuration of the PP Core, the complexity of the processing transformation, and/or the like. The variable delay may be different for each processed packet. Thus, Time Offset 416 may determine an offset to apply to a given packet to ensure that the processed packet is output at a fixed/predetermined time (e.g., a constant/predetermined time delay) after being received by the input of DPA 400. For example, assume that a packet is received by the input of DPA 400 at Time=X. The packet may be a portion of a stream being processed by the pool of PP Cores. DPA 400 may be configured to process received packets using the pool of PP Cores while ensuring that the order of individual packets are preserved and additional jitter is not introduced into the system. Prior to demultiplexing the packet from its corresponding data flow, the packet may be appended with metadata including a count value that indicates a relative order of arrival relative to other packets in the stream and/or a time associated with the arrival of the packet.

After being demultiplexed and assigned to one of the PP Cores, the packet may be multiplexed with other processed packets at an MServer. For example, the packets may be served for transmission upon a determination that the count value for the packet is the next count value to be served and/or that the current time is at least a predetermined time greater than the arrival time stored in the metadata for the packet. For example, Equation (1) indicates a possible relationship that may be utilized by DPA 400 to ensure that a processed packet is served for transmission at a fixed time after ingress to DPA 400:

$$t_{transmission} \geq t_{arrival} + t_{constant} \qquad \text{Equation (1)}$$

where $t_{arrival}$ may be the arrival time stored in metadata, $t_{constant}$ may be the predetermined desired processing delay for the DPA, and $t_{transmission}$ may be the desired transmission time at which the multiplexor would consider the time delay criteria to be met for the packet. When the current time is equal to $t_{transmission}$ (and/or exceeds $t_{transmission}$), if the MServer determines that the count value of the packet is the next count value to be served, the packet would then be served to the outbound network. By doing so packet jitter due to differences in processing time for different packets within a flow may be reduced.

In an example, the predetermined desired processing delay may be configured to be a constant value that is greater than the actual maximum delay for a packet, for example under a worst case scenario. The actual maximum delay may be determined based on the design of the processing algorithm and/or the maximum packet size. For example, large packets may arrive at the MServer near or slightly less than the actual maximum packet delay while small packets may arrive significantly faster than the actual maximum packet delay. In order to determine the amount of time a processed packet should be buffered prior to transmission, Time Offset 416 may determine an offset time for the packet. The offset time (e.g., $t_{offset}$) may be the difference in the predetermined desired process delay (e.g., $t_{constant}$) and the variable delay experienced by the packet during processing (e.g., $t_{delay}$), for example as expressed by Equation (2). The offset time may be the minimum length of time that the packet will be buffered before transmission at the output of the DPA.

$$t_{offset} = t_{constant} - t_{delay} \qquad \text{Equation (2)}$$

The metadata addition function at packet ingress (e.g., Time 414 and/or Count 418) may be implemented as one or more linear counters. For example, as discussed above Count 418 may be a linear synchronous counter that is incremented each time a packet in a given flow is received. Time 414 may be another linear counter that is configured to count at a resolution so as to meet the desired jitter requirements. For example, Count 418 and/or Timer 414 may be configured to increment/operate at frequencies that are greater than the minimum arrival time for a minimum packet size. In other words, Count 418 and/or Timer 414 may be configured to increment/operate at frequencies that ensure the counter is incremented faster than the time it takes to receive the smallest possible packet in from a high speed transmission network. In an example, Time 414 may be a calibrated source, although in some examples Time 414 may not be a calibrated source. However, in order to minimize jitter, the output time counter may be synchronous to the input time counter. In many circumstances, the introduction of the arrival time metadata to eliminate jitter may also cause the packet order to be preserved. Hence, in an example, the count value can be eliminated from the metadata appended to a packet and the time value may be used both to preserve in-sequence delivery and maintenance of a predetermined time delay for DPA processing.

One example of a practical application for the DPAs of FIG. 3 and/or FIG. 4 may be an Encryption Control Unit (ECU), which may be a network appliance intended to support the transmission of confidential information over an untrusted network in an encrypted fashion. For example an ECU may include a Data Encryption Unit (DEU) and/or a Data Decryption Unit (DDU). Although the following examples may be described in terms of data encryption within a DEU, the methods and systems may be equally applicable to data decryption, other packet processing techniques, other digital signal processing procedures (e.g., video encoding/decoding, etc.).

For example, multiple cryptographic cores (e.g., parallel processing cores) may be utilized in a single network appliance for data encryption. A DEU may be configured to encrypt packets in a data network environments such as Internet Protocol (e.g., IPsec, High Assurance Internet Protocol Encryptor (HAIPE) protocol, etc.) or Ethernet (e.g., MACsec), for example using multiple keys selected on a per-user basis. The DEU may encrypt the packets in such a way that the use of many parallel cores does not affect the external behavior of the unit (e.g., the method of encryption may be transparent to the decryptor). In other words, the encryption may be performed in a way so as to provide compatibility with DDUs operating a single core or a different number of cores.

The received packets may be multiplexed such that each packet is assigned to one of the encryption cores. The multiplexing of entire packets may facilitate the distribution of complex functions such as packet classification, checksum calculations (e.g., a Galois checksum calculation) to the parallel cores. By distributing individual packet processing to a core that is not dependent on the processing of the other packets in the other cores, the constraints and limitations associated with packet-word multiplexing may be avoided. Hence, the disclosed systems may provide efficient encryption/decryption of received packets even for small packet sizes. Moreover, packet re-ordering may be prevented by using a count based multiplexing method, even in the context of a single flow filling multiple processing cores. In other words, the allocation of an entire flow to a single core is may be avoided if desired. The result may be the capability to scale the performance of a given technology by a large factor (e.g., 16× or more) over that of traditional methods without the negative consequences of other parallel schemes. The amount in which the performance is be scaled may be directly proportional to the number of processing cores being utilized. Additionally, such an approach may take advantage of the increased circuit density provided by electronic circuit technology advancements.

Figure 5:
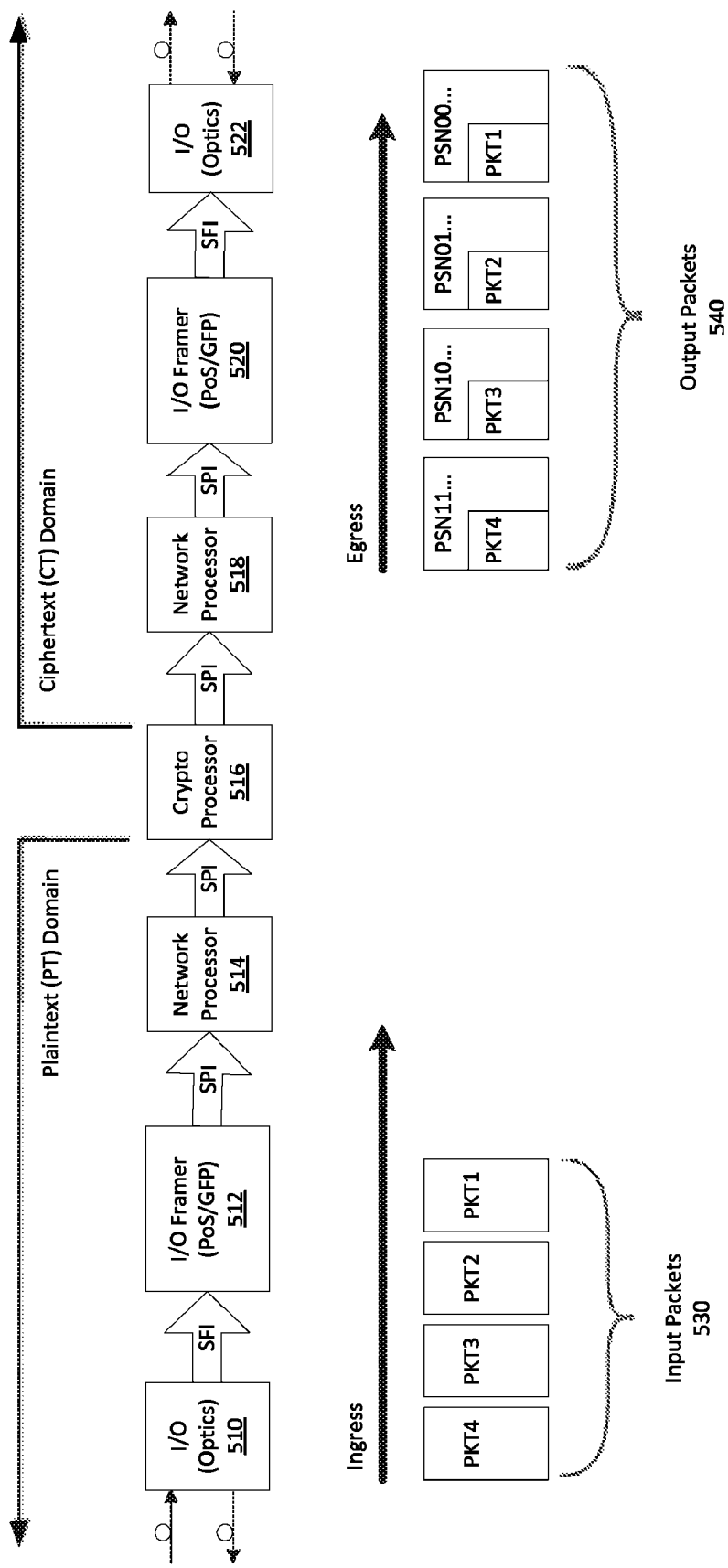
FIG. 5 illustrates an example data encryption unit (DEU) for application to data networks.

FIG. 5 illustrates an example DEU for application to data networks. The DEU may separate/delineate the Plaintext Domain (e.g., red) and the Ciphertext Domain (e.g., black), which may be associated with unsecured and secured data, respectively. The separation may be provided by the Cryptographic Processor (CP) 516. CP 516 may be configured to implement cryptographic algorithms and/or other trusted functions such as key management. Network protocols may be implemented in the red/black traffic domains, for example SONET, Ethernet, and/or the like. For example, one common processing step may be to check an incoming packet for errors. The network processor (e.g., Network Processor 514 and/or Network Processor 518) may perform packet classification based on network protocol headers to identify the data processing steps and security policy to be applied to the packet. Packet based DEUs typically support multiple keys and security policies for different network users. Classification may be used to determine which key and policy to apply. Example security policies may include "discard" or "transmit protected with key 1."

CP 516 may be configured to operate using symmetric encryption utilizing a secret key and an encryption algorithm. Example encryption algorithms may include the Advanced Encryption Standard (AES) (e.g. AES-128, AES-192, AES-256, etc.), Twofish, Serpent, Blowfish, Carlisle Adams Stafford Tavares (CASTS), Rivest Cipher 4 (RC4), Triple Data Encryption Algorithm (TDEA), International Data Encryption Algorithm (IDEA), other symmetric-key algorithms, and/or public-key encryption algorithms. For high data rates, the encryption algorithm may be implemented in dedicated hardware such as ASICs or FPGAs.

In an example, CP 516 may be configured to operate a Galois Counter Mode, where cryptographic initialization and data integrity are based on Galois math (e.g., Galois/Counter Mode or GCM). AES and GCM are example algorithms that may be implemented by CP 516 and may be used in conjunction with IPv4/IPv6 IPSec and/or Ethernet MACsec. For example, CP 516 may be initialized for each packet using a counter value that is different for each packet. The counter value may be a Packet Sequence Number (PSN). The PSN may be a cryptographic state variable used by the encryptor and/or decryptor cryptographic processors.

As illustrated in FIG. 5, Input Packets 530 may be received from a PT Domain network by I/O 510. I/O 510 may interface with a I/O Framer 512 via an SFI. Framer 512 may perform one or more of physical layer encoding/decoding, framing/de-framing, forward error correction (FEC), other Layer 1/Physical Layer processing, and/or the like. I/O Framer 510 may interface with Network Processor 514, for example via an SPI. Network Processor 514 may perform packet classification for the PT Domain Network, for example based on network protocol headers to identify the data processing steps and security policy to be applied to the packet. The packet may then be passed to CP 516, for example via an SPI.

CP 516 may include a pool of individual processing cores. The packet to be encrypted may be encrypted by CP 516. The encryption process may include encapsulating a PT packet from Input Packets 530 into an encrypted CT packet. The CT packet may include the PSN. The PSN may be generated by the encryptor (e.g., CP 516) when creating the CT packet and may be used to initialize the decryptor when attempting to recover the PT packet. AES and GCM are examples for the CP and other encryption techniques may be utilized.

Advances in symmetric encryption may be achieved using parallel processing techniques. For example, standard methods that utilize an Electronic Code Book (ECB) may provide 128 bits of key stream or encrypted data for each logic clock cycle. Cryptographic algorithms such as AES may use many sequential steps or rounds for encryption. However, many of the rounds may be performed in parallel if the a proper configuration is selected. Counter Mode is a highly efficient and high performance encryption technique because the algorithm can be fully unrolled, where each of many encryption steps may be performed by dedicated logical stages forming a long pipeline. Moreover, it may be possible to configure a system to micro-pipeline Counter Mode such that a single round may be performed by five registered stages. Such techniques may apply more hardware to increase performance. However, further advances can be achieved through the use of multiple encryption cores.

Figure 6:
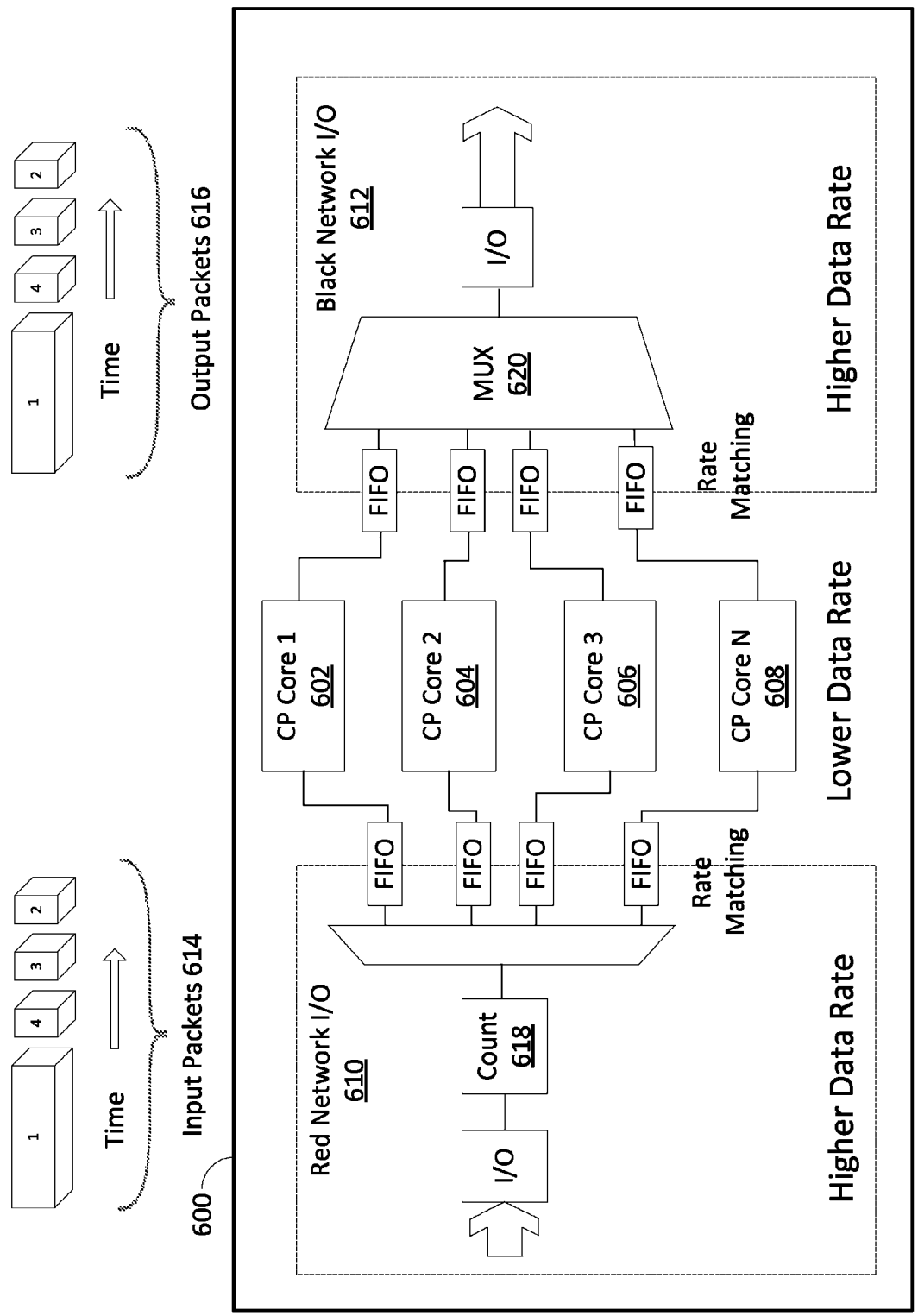
FIG. 6 illustrates an example DEU that may be configured to implement an encryption algorithm using the DPA architecture of FIG. 3.

FIG. 6 illustrates an example DEU (e.g., DEU 600) that may be configured to implement an encryption algorithm using the DPA architecture of FIG. 3. For example, DEU 600 may be configured to distribute PT packets received from a via Red Network I/O (e.g., Input Packet 614) to multiple CP cores (e.g., CP Core 1 602, CP Core 2 604, CP Core 3 606, CP Core N 608). Count 618 may be configured to append a count value to each of Input Packet 614 as metadata. The count values may then be used by MUX 620 to prevent out-of-order delivery of packets within a flow, for example when operating with variable size packets. Additionally, packet classification and ICV calculation may be distributed to the individual CP cores. For example, each CP core may include a duplicate copy of the classification database, which that may operate at 1/N rate relative to the Higher Data Rate domain, where N may be the number of CP cores. By distributing the classification to the individual cores the use of centralized classification may be implemented, and the decrease in data bus efficiency may be mitigated. Such an approach may be referred to as processing/encrypting/classifying packets on a per processing core or per processing unit basis.

The count-based multiplexor positioned to receive the encrypted packets from the individual CP cores (e.g., MUX 620) may be configured to ensure in-sequence delivery of the encrypted packet. For example, when a large packet with an earlier count value is delayed in arriving at the output relative to small packets with later count values, MUX 620 may delay servicing the small packets arriving out of order until the larger packet has been serviced. The smaller packets may be stored in rate matching FIFOs in order to match the delay of a larger packet. Once the count value criteria is satisfied, DEU 600 may serve encrypted Output Packets 616 to an untrusted network via Black Network I/O 612.

The Count inserted as metadata by Count 618 may be passed by the CP cores without encryption, similar to the way security association identifier is processed. The count value created on the input may thereby be available on the output side to provide an identifier to ensure packet order preservation. In addition to encryption/decryption, the methods and techniques disclosed herein may be equally applicable to any data processing appliance that is composed of parallel cores performing any time variable function.

It may be noted that the count value inserted as metadata by the central resource may be applied as the PSN in the encryption process. By using the count value as the PSN during the encryption/decryption process packet classicization may be further simplified for distribution to the individual CP cores and may simplify/streamline the parallel encryption process.

The systems and methods disclosed herein may be implemented on an FPGA device. For example, five (or more) parallel core processors may be implemented on an Altera Stratix IV FPGA, which may facilitate operation at 25 Gb/s per core, thus providing a total of theoretical capacity of 125 Gb/s. Of the 125 Gb/s theoretical capacity, 100 Gb/s may be more practical based on the I/O capability of the FPGA interface. The systems and methods disclosed herein may also be implemented in other custom electronic circuit designs or hardware designs, for example as found in commercially available ASICs or FPGAs. These devices may be configure to provide a relatively large amount of resources with which to implement many parallel packet processing engines to allow taking full advantage of the scalable approach disclosed herein.

In addition to packet encryption/decryption, other packet processing operations may be implemented using the above described methods. For example, processing functions that may be distributed to the individual cores may include one or more mathematical transformations (e.g., encryption/decryption, hash functions, etc.), data additions (e.g., header addition, packet encapsulation/framing, trailer addition, etc.), data modifications/translations (e.g., header translation, protocol translation, address translation, integrity checks, forward error correction, segmentation, etc.), data removals (e.g., header removal, packet de-encapsulation/de-framing, trailer removal, etc.), and/or data inspection and/or classification processes. For example, video encoding/decoding may include processing methods and processes that may be distributed across multiple cores. Packet classification and/or checksum addition may be distributed to individual cores.

Multiple data flows may be multiplexed and processed in a parallel across a plurality of processing cores. For example, each flow to be processed may be associated with a corresponding in-order delivery counter and/or timer. Hence, when a first packet that is associated with a first flow is received by a DPA, the count value for the first packet may be determined based on the value associated with a first counter. When a second packet that is associated with the first flow is received by the DPA, the count value for the second packet may be determined based on the next value associated with a first counter. A second counter may be used for a second flow. For example, when a first packet that is associated with a second flow is received by the DPA, the count value for the first packet of the second flow may be determined based on a value associated with a second counter. When a second packet that is associated with the second flow is received by the DPA, the count value for the second packet associated with the second flow may be determined based on the next value associated with the second counter. By associating each flow with a corresponding counter, in-order delivery may be maintained for packets within each of the respective flows while allowing packets from both flows to be multiplexed among the processing cores of the DPA. If the relative order of the packets among both flows is to be maintained (e.g., the order of receipt of packets from the first flow relative to packets in the second flow is to be maintained and vice versa), then the flows may share a common counter. If counters are maintained per flow, then the relative order within an individual flow may be maintained, but the relative order of packets from different flows may be altered.

In addition to packet processing, the methods and systems disclosed herein may be applicable to other processing applications. For example, when processing large amounts of data, a pool of processors may share one or more blocks of common memory. The shared memory may be logically divided into blocks of memory resources that store data to be processed. In an example, the data stored in the shared memory may be divided into discrete blocks of information/data for processing by a plurality of processors and/or processing cores. Each block of data may be processed in a manner similar to an individual packet as described above. For example, the block may be assigned a count value. The count value may be determined based on the relative position/order of the data block within the section of shared memory being processed. The count value may be appended to the data block as metadata for use in reordering the processed data blocks after they have been processed by the plurality of processors/processing cores.

For example, after the data block has been assigned a count value, the block may be assigned to one of a plurality of parallel processors for processing. The assigned processor may process or otherwise transform the block of data/information in accordance with the desired processing function. The count value may remain unmodified during the processing. For example, the processing may be a type of video processing (e.g., video compression/de-compression), a type of gaming function/processing, or some other type of processing intense function. Other data blocks, which may be of similar/same size of as the first data block or may be of different/varying size, may also be assigned count values based on their relative position within the shared access memory. These other data blocks may also be assigned to individual parallel processors/processing cores.

Upon egress from the plurality of processors, a multiplexor may be configured to reassemble/re-order the processed data blocks based on the appended metadata (e.g., the count value). For example, the processed data blocks may replace the original data in the shared memory and/or may be stored in a new shared or unshared memory location. The count values attached to individual data blocks may be used to determine the appropriate order for storing the processed data blocks in the output memory. For example, a processed data block may be stored in the shared memory at a given location relative to other processed data blocks that corresponds to the location of the original unprocessed data block relative to other unprocessed data blocks within the original collection of data that is being processed. In other words, the relative order of the data may be preserved and/or the processing by the plurality of processors/processing cores may refrain from affecting the relative order of the data stored in the shared memory. The result may be that the processed data may be in the same relative order as if the data had been processed by a single processor/processor core.

Other techniques described herein, such as the use of a timestamp, performing certain processing functions on a per processor basis (e.g., checksum, classification, etc.), and/or the like may also be applicable to the processing of the data blocks, for example the data blocks of shared memory.

Embodiments may take the form of a tangible computer-usable or computer-readable storage medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A processor may be configured to execute instructions stored in memory to perform the various functions described herein.

What is claimed:

1. A data processing appliance (DPA) comprising:
   an input configured to receive a plurality packets;
   a demultiplexor configured to append metadata to the plurality of packets, wherein the metadata indicates an order in which the plurality of packets were received;
   a plurality of processing cores, each of the plurality of processing cores configured to process a portion of the plurality of packets independent of the other processing cores; and
   a multiplexor configured to:
      multiplex the plurality of packets after the plurality of packets are output from the plurality of processing cores based on the appended metadata, and
      prior to sending a given packet to an output, ensure the output of the given packet is delayed by at least a predetermined amount of time relative to an arrival time of the given packet using metadata corresponding to the given packet, wherein the metadata corresponding to the given packet comprises a timestamp value, and the predetermined amount of time exceeds an expected maximum processing delay for a maximum packet size given the processing task implemented by the plurality of processing cores.

2. The DPA as in claim 1, wherein each of the plurality of processing cores is configured to process the portion of the plurality of packets by encrypting the packets or decrypting the packets.

3. The DPA as in claim 2, wherein the metadata further comprises count values and the count values are used as a packet sequence number (PSN) for one of a packet encryption process or packet decryption process for the plurality of packets.

4. The DPA as in claim 1, wherein multiplexor is configured to determine the timestamp value for the given packet using a linear counter that is capable of incrementing at a frequency greater than a frequency at which packets of a minimum packet size can be received at the input.

5. The DPA as in claim 4, wherein the timestamp value for the given packet is appended to the given packet in order to avoid introducing jitter into the plurality of packets due to DPA processing.

6. The DPA as in claim 1, wherein the plurality of packets are output to a high-speed optical communication network.

7. A method implemented by a data processing appliance (DPA), the method comprising:
   the DPA receiving a plurality packets;
   the DPA appending metadata to the plurality of packets, wherein the metadata indicates an order in which the plurality of packets were received;
   the DPA utilizing a plurality of processing cores to process the plurality of packets, wherein each of the plurality of processing cores processes a portion of the plurality of packets independent of the other processing cores;
   the DPA multiplexing the plurality of packets after the plurality of packets are output from the plurality of processing cores based on the appended metadata; and
   prior to sending a given packet to an output, the DPA ensuring the output of the given packet is delayed by at least a predetermined amount of time relative to an arrival time of the given packet using metadata corresponding to the given packet, wherein the metadata corresponding to the given packet comprises a timestamp value, and the predetermined amount of time exceeds an expected maximum processing delay for a maximum packet size given the processing task implemented by the plurality of processing cores.

8. The method as in claim 7, wherein each of the plurality of processing cores processes the portion of the plurality of packets by encrypting the packets or decrypting the packets.

9. The method as in claim 8, wherein the metadata further comprises count values and the count values are used as a packet sequence number (PSN) for one of a packet encryption process or packet decryption process for the plurality of packets.

10. The method as in claim 7, further comprising the DPA determining the timestamp value for the given packet using a linear counter that is capable of incrementing at a frequency greater than a frequency at which packets of a minimum packet size are received at the input.

11. The method as in claim 10, wherein the timestamp value for the given packet is appended to the given packet in order to avoid introducing jitter into the plurality of packets due to DPA processing.

12. The method as in claim 7, wherein the plurality of packets are output to a high-speed optical communication network.

* * * * *